United States Patent [19]
Bin

[11] Patent Number: 6,082,156
[45] Date of Patent: Jul. 4, 2000

[54] ANTITHEFT CASE FOR PREVENTING PACKED COMPACT DISCS FROM BEING STOLEN

[75] Inventor: Im Ok Bin, Kyunggi-Do, Rep. of Korea

[73] Assignee: Jee Tae Kim, Northbrook, Ill.

[21] Appl. No.: 09/166,289

[22] Filed: Oct. 5, 1998

[30] Foreign Application Priority Data

Oct. 16, 1997 [KR] Rep. of Korea ...................... 97-53054

[51] Int. Cl.[7] .................................................. B65D 85/57
[52] U.S. Cl. ................................ 70/57.1; 70/63; 70/276; 206/1.5; 206/308.2; 206/387.11
[58] Field of Search ................................ 70/57.1, 57, 58, 70/63, 276; 206/1.5, 308.2, 387.11; 292/80, 81, 251.5

[56] References Cited

U.S. PATENT DOCUMENTS

| | | | |
|---|---|---|---|
| 2,797,015 | 6/1957 | Grosz | 206/1.5 X |
| 3,871,516 | 3/1975 | Holkestad et al. | 206/387.11 X |
| 4,436,201 | 3/1984 | Inaba | 206/1.5 X |
| 4,634,004 | 1/1987 | Mortensen | 206/1.5 X |
| 4,678,080 | 7/1987 | Nelson | 206/1.5 X |
| 5,100,015 | 3/1992 | Vanderstayf | 292/87 X |
| 5,307,927 | 5/1994 | Curtis et al. | 206/308.2 X |
| 5,375,708 | 12/1994 | Wittman | 206/1.5 X |
| 5,375,712 | 12/1994 | Weisburn | 206/387.11 |
| 5,524,752 | 6/1996 | Mazzucchelli | 206/387.11 X |
| 5,598,728 | 2/1997 | Lax | 70/57.1 X |
| 5,718,332 | 2/1998 | Tachibana | 206/387.11 X |
| 5,904,246 | 5/1999 | Weisburn et al. | 206/308.2 |

FOREIGN PATENT DOCUMENTS 461049   12/1991   European Pat. Off. ................. 206/1.5

*Primary Examiner*—Lloyd A. Gall
*Attorney, Agent, or Firm*—Browdy and Neimark

[57] ABSTRACT

An antitheft case for preventing packed compact discs from being stolen is disclosed. The antitheft case has a base part. A lock part slidably engages with the base part, thus forming a box-shaped and openable body in cooperation with the base part. A lock assembly selectively locks or unlocks the position of the slidable lock part relative to the base part. The antitheft case of this invention has a simple and compact construction, thus allowing manufacturers to easily produce such cases at low cost and allowing disc sellers to easily and effectively lay out the discs for sale within a limited area. The case is also reliably locked, so that it effectively prevents the packed compact discs from being stolen by any unauthorized persons.

1 Claim, 9 Drawing Sheets

ANTITHEFT CASE FOR PREVENTING PACKED COMPACT DISCS FROM BEING STOLEN

BACKGROUND OF THE INVENTION

1. Field of the Invention

The present invention relates, in general, to cases for compact discs and, more particularly, to an antitheft case for packed compact discs having a simple construction, capable of being reliably locked, thus effectively preventing a packed compact disc from being stolen by any unauthorized persons.

2. Description of the Prior Art

As well known to those skilled in the art, compact discs are effective recording media for data, such as audio, video and MPEG data. In an effort to protect data of the compact discs, such discs are packed in specified packs by users, disc manufacturers or disc sellers. The packed compact discs are, thereafter, received in a special disc case.

In a show window, packed compact discs are laid out for sale while being cased in such cases. The disc cases maximize the exhibition effect of the compact discs. Such known disc cases are typically designed for having an antitheft structure.

FIGS. 1 to 4 show the construction of a typical antitheft case for packed compact discs. As shown in the drawings, the compact disc case 100 has a thin box shape and comprises a bottom plate 110 with four side walls 111, 112, 113 and 114. The four side walls 111,112,113 and 114, formed on the four edges of the bottom plate 110, meet with the bottom plate 110 and each other at right angles, so that the side walls of the case 100 has a box shape. Four top corners of the case 100 are individually provided with a stopper 115, 116, 117 and 118 for retaining the packed disc within the case 100.

The bottom plate 110 has an opening 119 for allowing a user to push up a packed disc 120(shown in FIG. 4 with dashed line) outside the bottom plate 110 by a finger when it is necessary to take the packed disc 120 out of the case 100. A lock assembly 121 is provided on one side wall 114 of the case 100 for preventing the packed disc 120 from being out of the case 100.

As shown in FIGS. 2 and 3, the above lock assembly 121 comprises a housing "H" exteriorly provided on the side wall 114 of the case 110. A U-shaped elastic piece 122 is received in the housing "H" with both ends of the piece 122 being elastically and magnetically movable as will be described later herein. A latch "L" is ejectably set in the housing "H" in a way such that the latch "L" is elastically retracted into or ejected from the housing "H" while being locked or unlocked by both ends of the elastic piece 122.

That is, the elastic piece 122 is made of a magnetic material, so that both ends of the piece 122 in the housing "H" are selectively and magnetically biased outwardly by the magnetic force of an unlocking device 123 as shown in FIG. 4. Therefore, the latch "L" can be locked or unlocked by both ends of the elastic piece 122 as desired. The above latch "L" thus selectively fixes the position of the packed disc 120 in the disc case 100 or allows the packed disc 120 to be out of the case 100.

However, such typical antitheft compact disc cases are problematic in that the lock assembly protrudes from a side wall of the case, thus complicating the construction and spoiling the appearance of the cases. Due to such a lock assembly, it is somewhat difficult to lay out the disc cases for sale, thus being disadvantageous to disc sellers. Such a lock assembly, complicating the construction of the disc cases, results in a complication of the manufacturing process for the cases and increases the manufacturing cost of the cases. Therefore, disc cases with such a lock assembly are inconvenient to manufacturers. In addition, the above disc cases are somewhat inconvenient to users due to such lock assemblies.

The above lock assembly is not designed for completely locking the case, thus allowing any unauthorized persons to distort a disc case at a twisting angle to open the case prior to easily stealing the data of the disc. The lock assembly may be also unlocked by a pin in place of a specified key, so that the assembly cannot effectively prevent packed compact discs from being stolen by unauthorized persons.

SUMMARY OF THE INVENTION

Accordingly, the present invention has been made keeping in mind the above problems occurring in the prior art, and an object of the present invention is to provide an antitheft case for preventing packed compact discs from being stolen, which has a simple and compact construction, thus allowing manufacturers to easily produce such cases at low cost and allowing disc sellers to easily and effectively lay out the discs for sale within a limited area, and which is reliably locked, thus effectively preventing the packed compact discs from being stolen by any unauthorized persons.

In order to accomplish the above object, the present invention provides an antitheft case for preventing a packed compact disc from being stolen, comprising: a base part; a lock part slidably engaging with the base part, thus forming a box-shaped and openable body in cooperation with the base part; and a lock assembly for selectively locking or unlocking a position of the slidable lock part relative to the base part.

The base part comprises: a rectangular bottom plate having a specifically patterned opening for allowing a user to push up a packed compact disc outside the bottom wall when necessary; three side walls formed on three edges of the bottom wall, two opposite side walls of the three side walls being used as guide walls for the lock part; and a disc stopper provided at each top corner between the side walls for selectively retaining the packed compact disc.

The lock part comprises: two slidable side walls integrated with each other into a U-shaped single structure by an extension wall, the two slidable side walls exteriorly and movably engaging with the guide walls of the base part, thus being slidable along the guide walls; and a disc retaining plate extending along the extension wall while having a width, thus selectively retaining the packed compact disc.

The lock assembly comprises: locking means provided on the base part; and clip means provided on the lock part for selectively locking the lock part to the locking means of the base part.

The locking means comprises a locking hole exteriorly formed on each of the guide walls of the base part, while the clip means comprises an elastic piece interiorly provided on each of the slidable side walls of the lock part. The elastic piece has locking projections selectively engaging with the locking hole of each of the guide walls of the base part.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
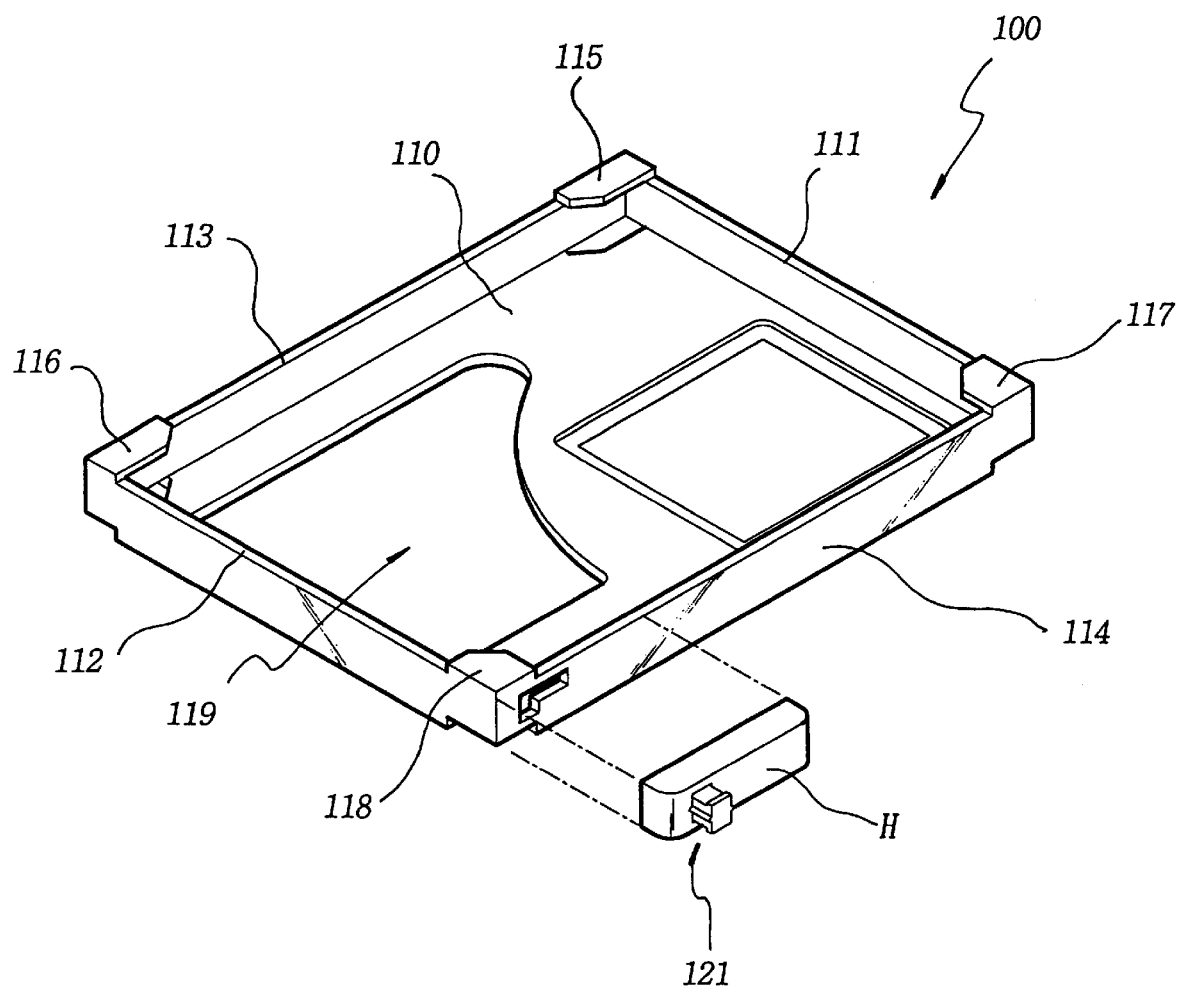
FIG. 1 is an exploded perspective view of a typical antitheft case for packed compact discs, with a lock assembly being provided on one side wall of the case.
Figure 2:
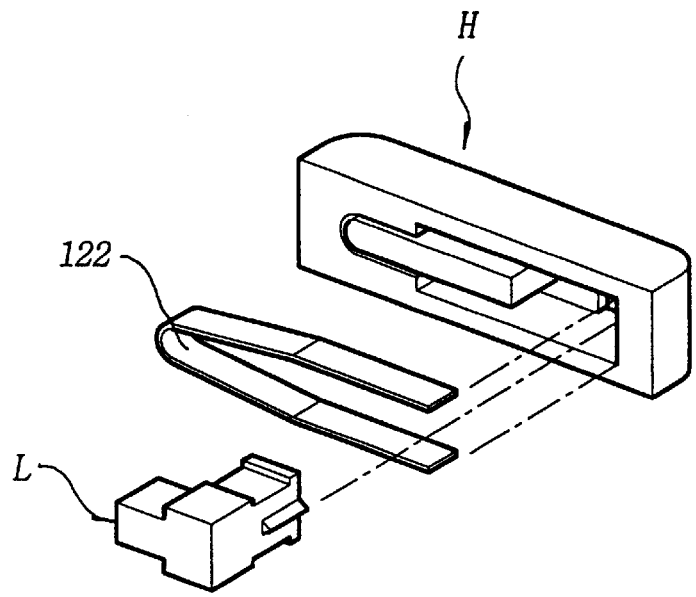
FIG. 2 is an exploded perspective view of the lock assembly provided on the case of FIG. 1.
Figure 3:
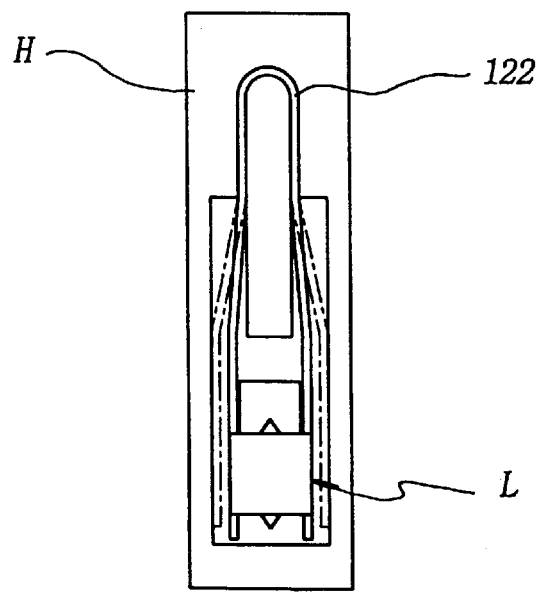
FIG. 3 is a front view showing the relative position of the parts set in the housing of the lock assembly of FIG. 2.
Figure 4:
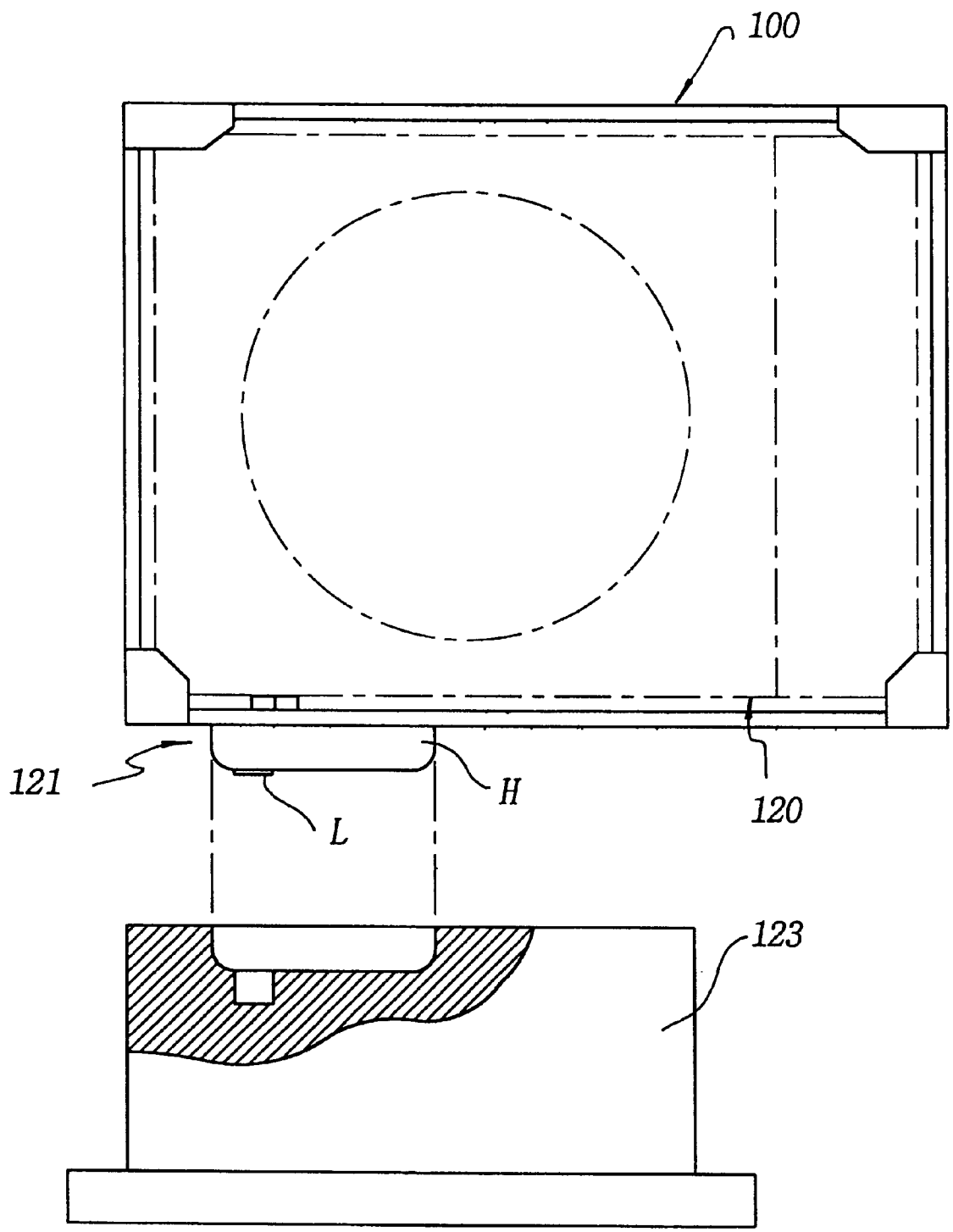
FIG. 4 is a view showing the operation of the case of FIG. 1 with a packed compact disc being received in the case.
Figure 5:
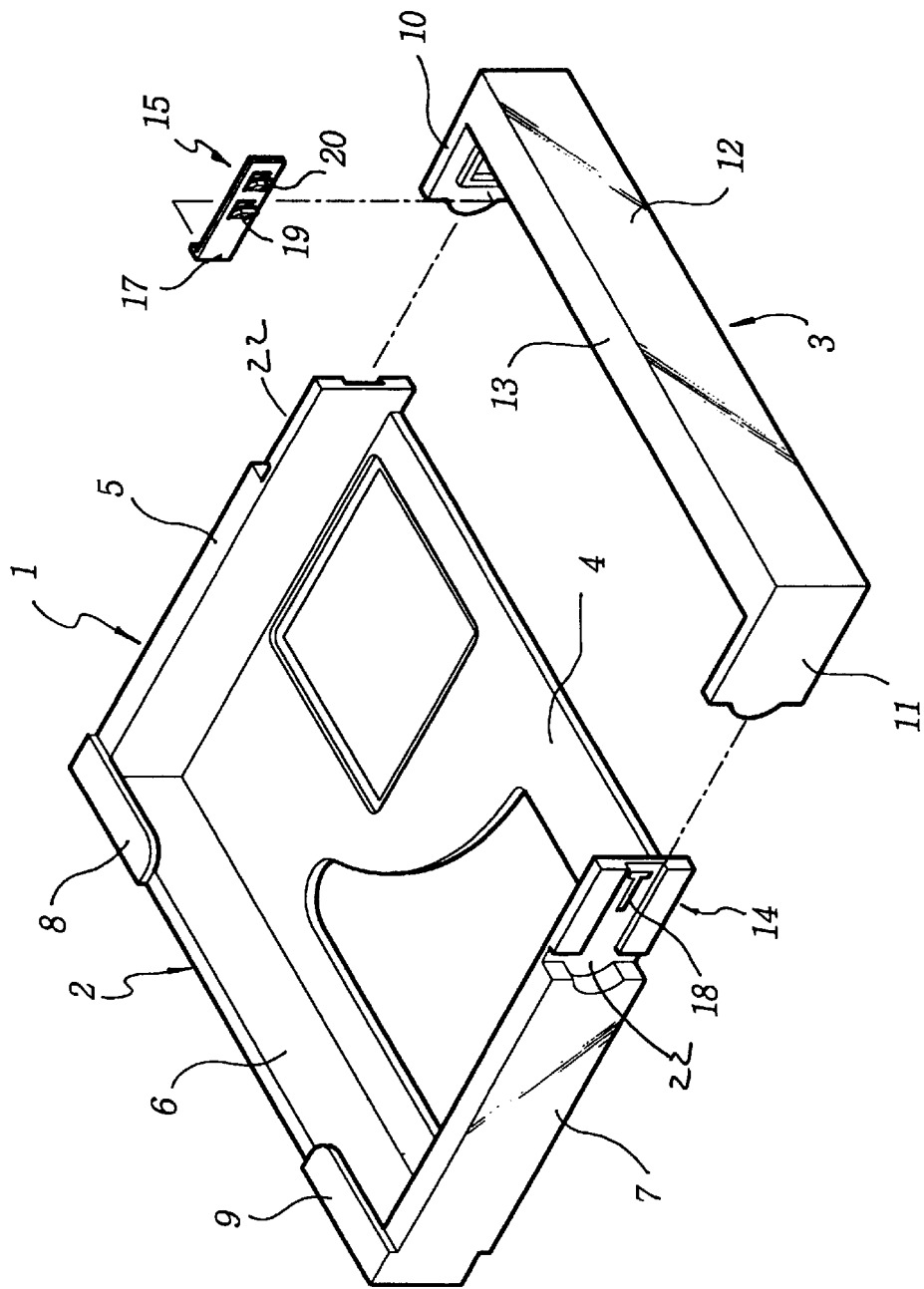
FIG. 5 is an exploded perspective view of an antitheft case for compact discs in accordance with the primary embodiment of the present invention.
Figure 6:
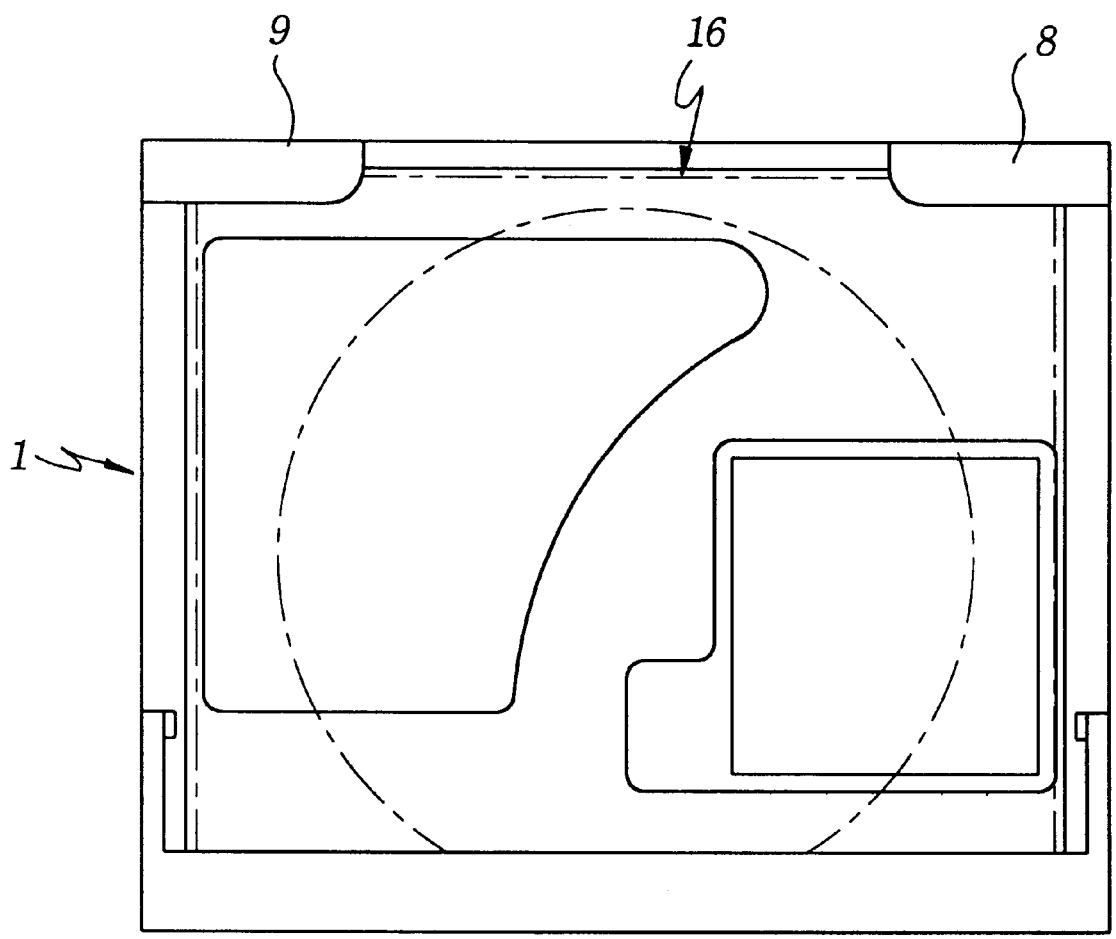
FIG. 6 is a view showing the case of FIG. 5 with a packed compact disc being received in the case.
Figure 7:
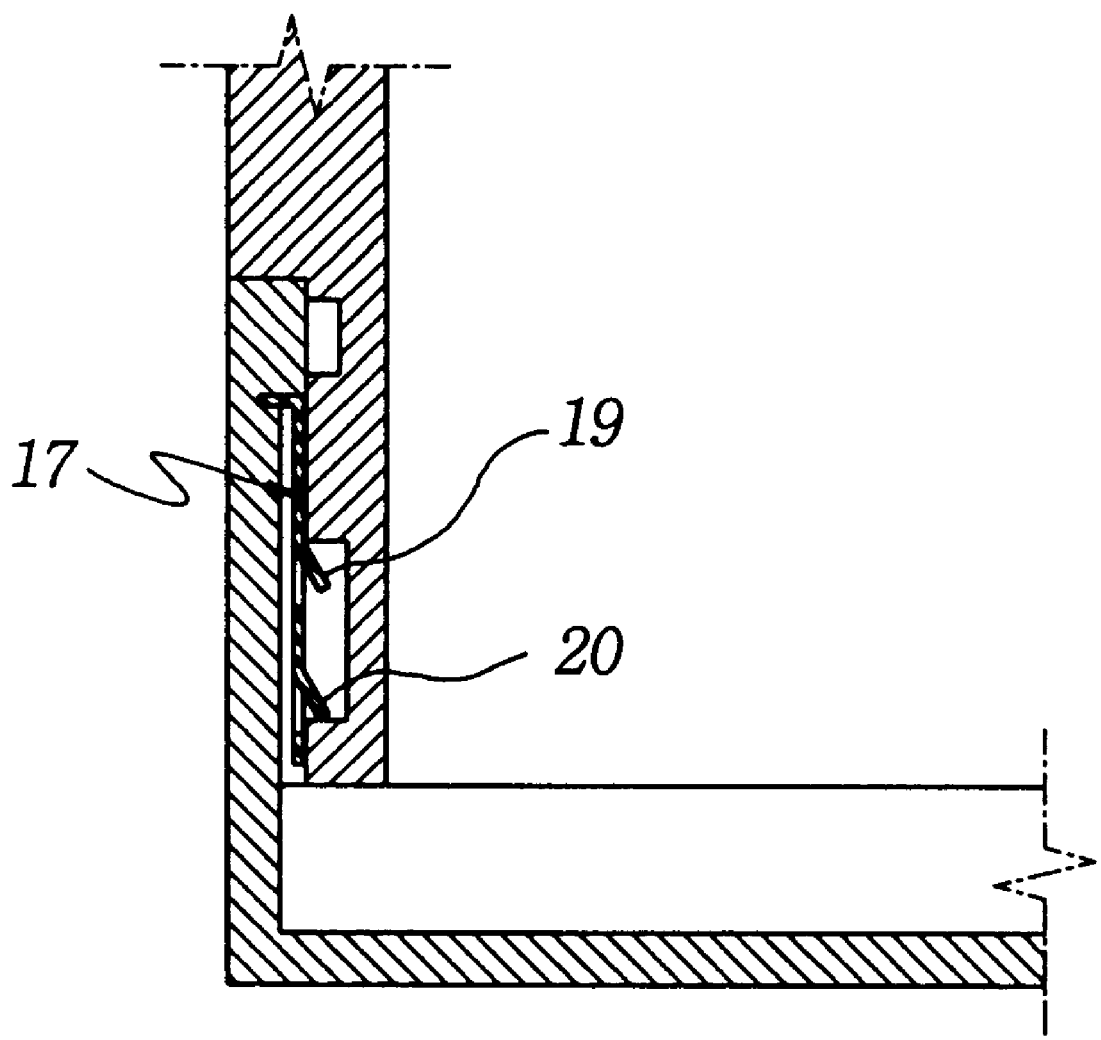
FIG. 7 is a sectional view of a lock assembly provided on the case of FIG. 4.

FIGS. 5 to 7 show the construction of an antitheft case for packed compact discs in accordance with the primary embodiment of the present invention.

As shown in the drawings, the antitheft case 1 of this invention generally consists of two parts: a base part 2 and a lock part 3 which are slidably assembled with each other into a thin box-shaped and openable body. That is, the lock part 3 is designed for being coupled to and slidable along opposite side walls of the base part 2 to be retracted or extended relative to the base part 2 within a predetermined distance. The lock part 3 thus reliably locks or unlocks a packed disc 16 within the case 1 as shown in FIG. 6. Therefore, the case 1 almost completely prevents the disc 16 from being stolen by any unauthorized persons.

The base part 2 comprises a bottom plate 4 with three side walls 5, 6 and 7. The three side walls 5, 6 and 7, formed on three edges of the bottom plate 4, meet with the bottom plate 4 and each other at right angles, so that only the three side walls of the case 1 are closed with one remaining side wall being open, and thus the case 1 has a thin box shape. Of the three side walls 5, 6 and 7, the two opposite side walls 5 and 7 are used as guide walls as will be described later herein. The bottom plate 4 has a specifically patterned opening for allowing a user to push up a packed disc 16 outside the bottom plate 4 by a finger when it is necessary to take the disc 16 out of the case 1. Two corners of the case 1 are individually provided with a stopper 8 and 9 for retaining the packed disc 16 within the case 1.

The lock part 3 comprises two slidable side walls 10 and 11. The two side walls 10 and 11 are integrated with each other into a single structure by an extension wall 12, thus having a U-shaped configuration. The extension wall 12 is provided with a retaining plate 13. The two side walls 10 and 11 of the lock part 3 exteriorly and slidably engage with a groove 22 in the opposite guide walls 5 and 7 of the base part 2, respectively, thus being slidable along the guide walls 5 and 7.

The disc retaining plate 13, extending along the top edge of the extension wall 12 while having a predetermined width, prevents a packed disc 16 from being unexpectedly out of the case 1 when the lock part 3 moves into its fully retracted position relative to the base part 2. In order to lock or unlock the lock part 3 relative to the base part 2, a lock assembly is provided at each of the two slidable engagement portions of the case 1. As shown in FIG. 5, the lock assembly comprises two means: a locking means 14 provided on the base part 2 and a clip means 15 provided on the lock part 3.

The locking means 14 comprises a locking hole 18 exteriorly formed on each guide wall 5, 7 of the base part 2. Meanwhile, the clip means 15 comprises an elastic piece 17 interiorly provided on each side wall 10, 11 of the lock part 3. When the lock part 3 engages with the base part 2, each elastic piece 17 comes into slidable contact with the exterior surface of an associated guide wall 5, 7 of the base part 2. In such a case, each elastic piece 17 is designed for allowing its free end to be elastically movable. As shown in FIGS. 5 and 6, the elastic pieces 17 individually have two or more locking projections 19 and 20. The above locking projections 19 and 20 selectively engage with the locking hole 18 of each guide wall 5, 7 when the lock part 3 slides along the guide walls 5, 7 of the base part 2.

Figure 8:
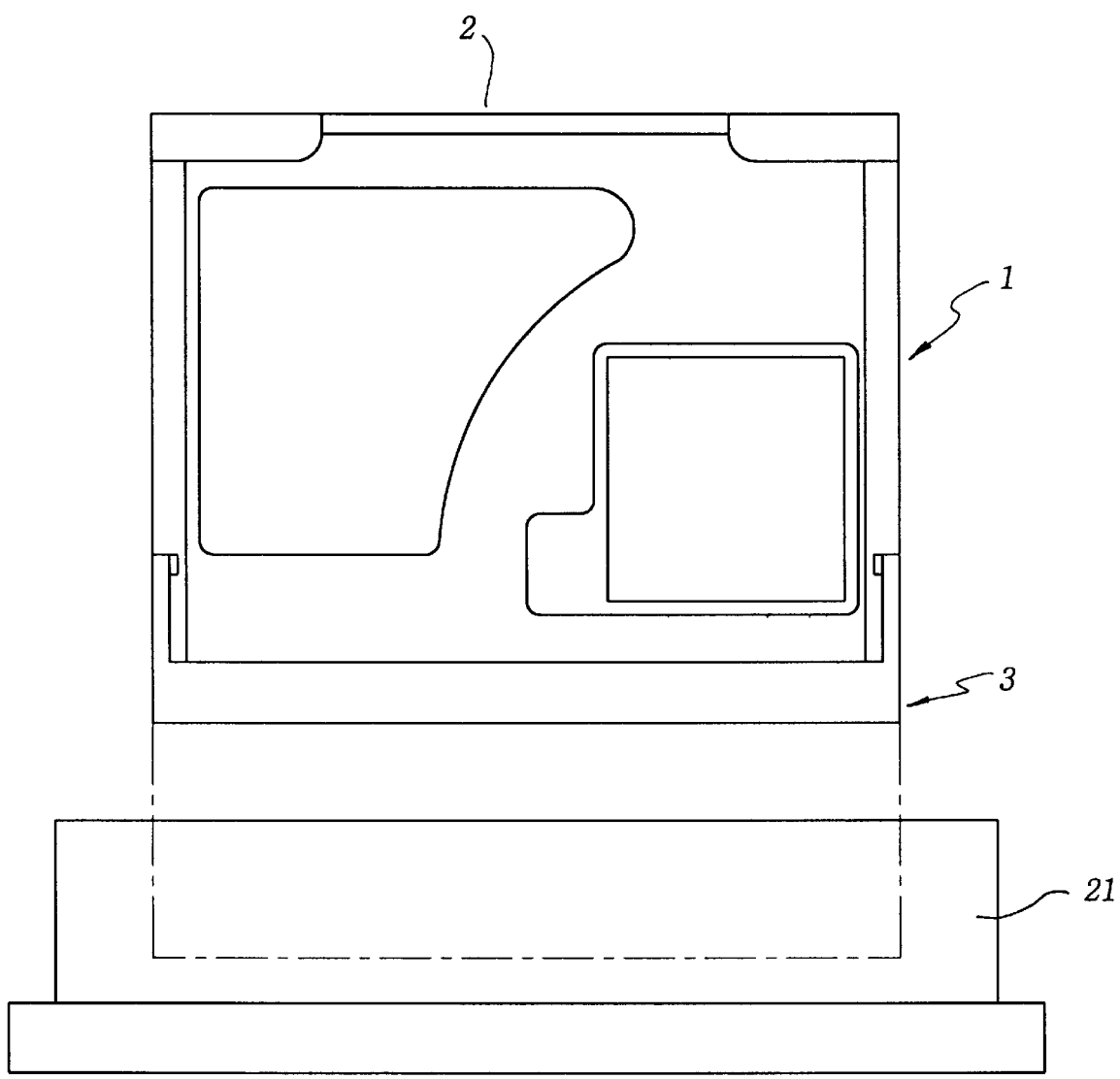
FIG. 8 is a view showing the operation of the case of FIG. 4 with a packed compact disc being received in the case.

The elastic pieces 17 are made of a magnetic material, so that the pieces 17 are selectively and magnetically biased outwardly by the magnetic force of an unlocking device 21 as shown in FIG. 8. When the elastic pieces 17 are magnetically biased outwardly by the device 21, the locking projections of the pieces 17 are removed from the locking holes 18, respectively. The two side walls 10 and 11 of the lock part 3 are thus movable on the guide walls 5 and 7 of the base part 2 outwardly. When the lock part 3 is pulled from the base part 2, the case 1 is opened and this allows the packed disc 16 to be removable from the case 1.

In the above description, the antitheft case of this invention is used for safely casing packed compact discs as an example. However, its should be understood that the case of this invention also may be used for safely casing packed cassette tapes as will be described hereinbelow in conjunction with FIGS. 9 and 10.

Figure 9:
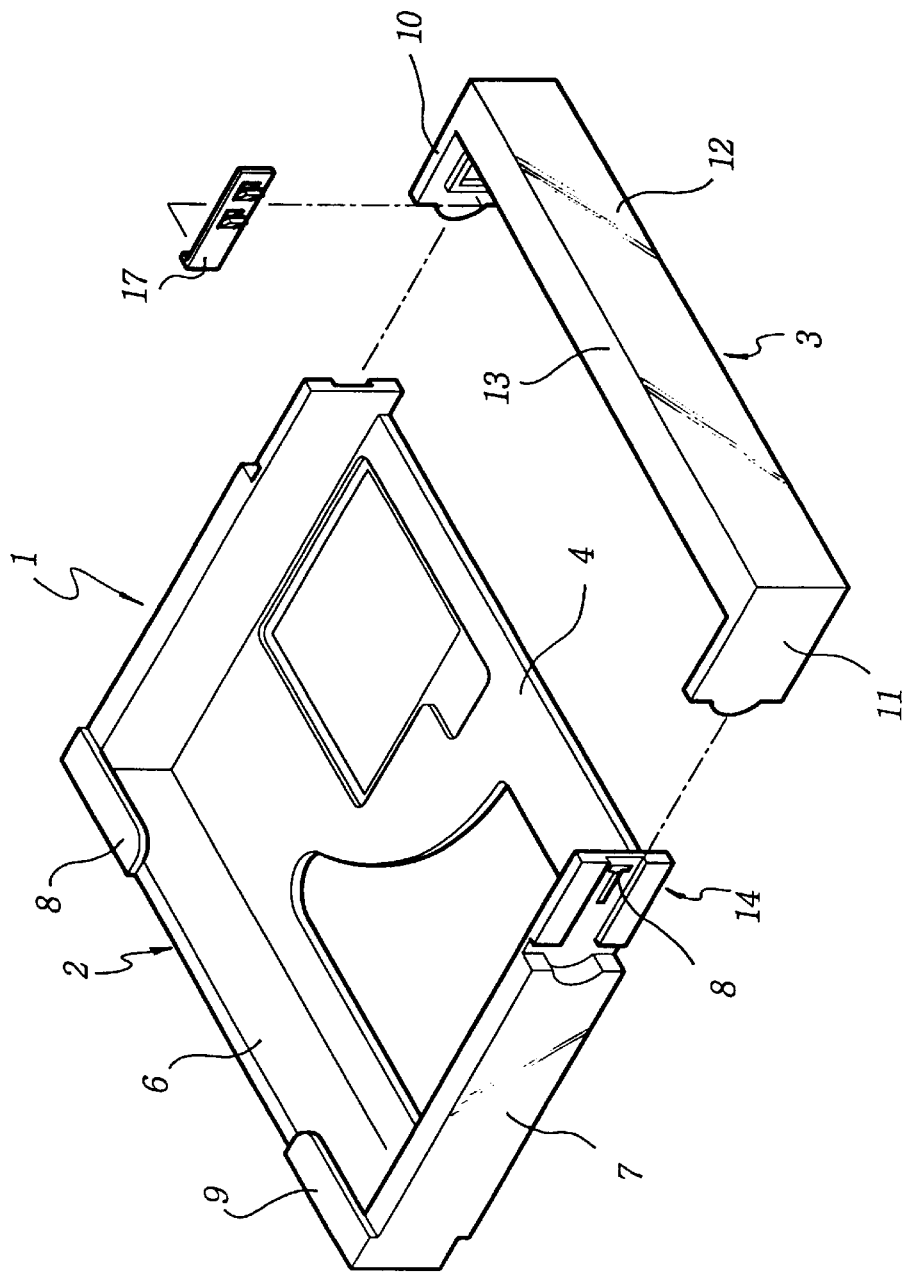
FIG. 9 is an exploded perspective view of an antitheft case for packed cassette tapes in accordance with another embodiment of the present invention.
Figure 10:
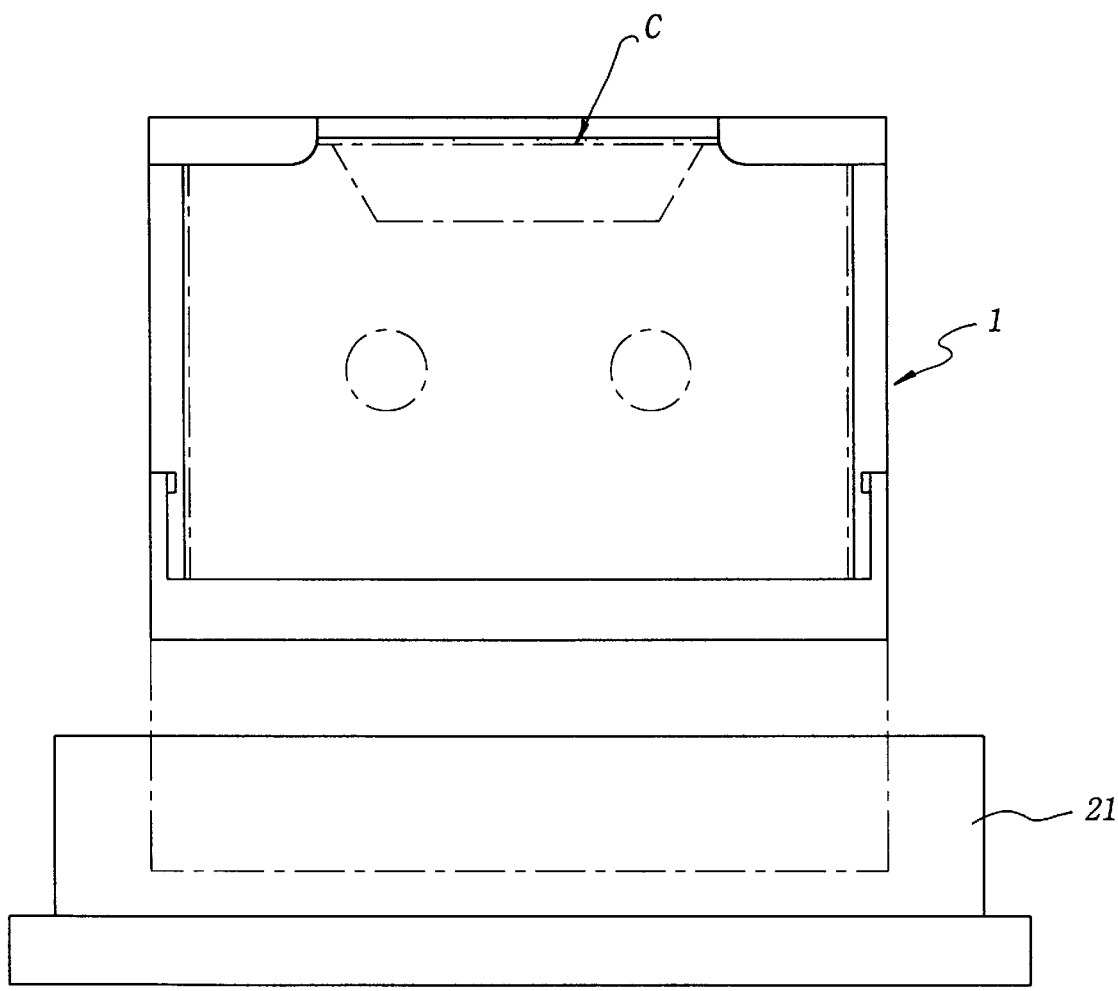
FIG. 10 is a view showing the operation of the case of FIG. 9 with a packed cassette tape being received in the case.

FIGS. 9 and 10 show an antitheft case for cassette tapes in accordance with the second embodiment of this invention. In this embodiment, the case is for casing packed cassette tapes. That is, the case of this embodiment has a configuration and construction suitable for safely casing packed cassette tapes "C" in place of packed compact discs. In the second embodiment, the general shape, construction and operational effect of the case remains the same as that described for the primary embodiment and further explanation is thus not deemed necessary.

As described above, the present invention provides an antitheft case for compact discs. The case has a simple and compact construction, thus allowing manufacturers to easily produce such cases at low cost and allowing disc sellers to easily and effectively lay out the discs for sale within a limited area. The case is also reliably locked, thereby effectively preventing the packed compact discs from being stolen by any unauthorized persons. The case is thus convenient to users. Of course, the case of this invention also may be used for casing cassette tapes in place of compact discs if the size of the case meets such cassette tapes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An antitheft case for preventing packed compact discs from being stolen, comprising:

a base part including a bottom plate and three base part side walls formed along three edges of the bottom plate and meeting at corners of the bottom plate, and a respective disc stopper located at a top of each of the corners between said base part side walls for selectively retaining the packed compact discs, wherein two opposite side walls of said three base part side walls are adapted as guide walls, and each of said two opposite side walls includes a respective groove;

a lock part including two slidable lock part side walls integrated with each other into a U-shaped single structure by an extension wall, and a disc retaining plate extending along said extension wall, said disc retaining plate including a predetermined width adapted to selectively retain the packed compact discs, wherein said two slidable lock part walls are exteriorly and slidably engagable with each said groove of said two opposite side walls of said base part; and a lock assembly for selectively locking or unlocking a sliding position of said lock part relative to said base part, said lock assembly including a lock structure provided on said base part and a clip provided on said lock part for selectively locking said lock part to said lock structure of said base part;

wherein said lock structure comprises a locking hole exteriorly disposed on each said groove of said two opposite side walls of said base part, and wherein said clip comprises an elastic piece interiorly disposed on each of said lock part side walls, said elastic piece including locking projections selectively engagable with said locking hole; and wherein said elastic piece includes magnetic material, whereby said locking projections of said elastic piece are magnetically removable from said locking holes by magnetically pulling said elastic piece outward.

* * * * *